US010560095B2

(12) United States Patent
O'Dwyer et al.

(10) Patent No.: US 10,560,095 B2
(45) Date of Patent: Feb. 11, 2020

(54) IMPEDANCE-BASED PHYSICAL UNCLONABLE FUNCTION

(71) Applicant: Analog Devices, Inc., Norwood, MA (US)

(72) Inventors: Thomas G. O'Dwyer, Arlington, MA (US); Tze Lei Poo, Cambridge, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 15/987,776

(22) Filed: May 23, 2018

(65) Prior Publication Data

US 2019/0363714 A1    Nov. 28, 2019

(51) Int. Cl.
*H03K 19/003* (2006.01)
*H04L 9/32* (2006.01)

(52) U.S. Cl.
CPC ..... *H03K 19/00369* (2013.01); *H04L 9/3278* (2013.01)

(58) Field of Classification Search
None
See application file for complete search history.

(56) References Cited

U.S. PATENT DOCUMENTS

| 8,525,169 | B1* | 9/2013 | Edelstein | H01L 23/544 |
| | | | | 257/48 |
| 8,610,454 | B2 | 12/2013 | Plusquellic et al. | |
| 8,971,527 | B2 | 3/2015 | BrightSky et al. | |
| 9,059,188 | B1* | 6/2015 | Dimitrakopoulos | |
| | | | | H01L 23/573 |
| 9,350,354 | B2 | 5/2016 | Wang et al. | |

(Continued)

FOREIGN PATENT DOCUMENTS

| CN | 105184191 A | 1/2018 |
| EP | 3 193 281 A1 | 7/2017 |
| WO | WO 2017/027762 A1 | 2/2017 |

OTHER PUBLICATIONS

Addabbo et al., Physically Unclonable Functions Derived From Cellular Neural Networks. IEEE Transaction on Circuits and Systems I. 2013; 23 pages.

(Continued)

*Primary Examiner* — Minh D A
*Assistant Examiner* — James H Cho
(74) *Attorney, Agent, or Firm* — Wolf, Greenfield & Sacks, P.C.

(57) ABSTRACT

According to various aspects, systems and methods for providing a soft-decoding physical unclonable function are provided. According to one embodiment, PUF circuitry includes circuit elements with impedance values that are used to generate a PUF value. For example, one or more resistors may be connected to a voltage source. The resistors may generate a resulting voltage signal that is measured and indicates a ratio of the impedance values of the resistors. Due to manufacturing variations, each impedance value may be unique, such that the impedance values may be used to provide a unique number sequence. Each ratio value may be converted into a single bit or multi-bit digital value through digitization, for example with a comparator and/or an analog to digital converter, and the series of digital values may represent or be used to generate a unique number sequence.

20 Claims, 12 Drawing Sheets

(56) References Cited

U.S. PATENT DOCUMENTS

| | | | |
|---|---|---|---|
| 9,461,826 | B2 | 10/2016 | Kreft |
| 9,485,094 | B1* | 11/2016 | Parvarandeh ......... H04L 9/0866 |
| 9,489,999 | B2 | 11/2016 | Rosenberg et al. |
| 9,703,989 | B1 | 7/2017 | Pedersen |
| 9,876,498 | B2 | 1/2018 | Zhao et al. |
| 9,941,880 | B1* | 4/2018 | Lesea ................... H03K 19/003 |
| 10,211,993 | B2* | 2/2019 | Deyati .................. H04L 9/3278 |
| 2011/0299678 | A1 | 12/2011 | Deas et al. |
| 2011/0317829 | A1 | 12/2011 | Ficke et al. |
| 2013/0106461 | A1* | 5/2013 | Ficke ..................... H04L 9/3278 326/8 |
| 2013/0276151 | A1 | 10/2013 | Lewis et al. |
| 2014/0042627 | A1 | 2/2014 | Edelstein et al. |
| 2015/0071432 | A1 | 3/2015 | Zhu et al. |
| 2016/0148680 | A1 | 5/2016 | Yoshimoto et al. |
| 2017/0178710 | A1* | 6/2017 | Augustine ................ G11C 7/24 |
| 2018/0337793 | A1* | 11/2018 | Park ....................... H04L 9/3278 |

OTHER PUBLICATIONS

Bhargava et al., Attack Resistant Sense Amplifier Based Pufs (SA-PUF) With Deterministic and Controllable Reliability of PUF Responses. 2010 IEEE International Symposium on Hardware-Oriented Security and Trust (HOST). Jun. 13, 2010; pp. 106-111.

Gao et al., Emerging Physical Unclonable Functions with Nanotechnology. IEEE Access. Dec. 2015;XX(YY):1-19.

Gao et al., Memristive Crypto Primitive for Building Highly Secure Physical Unclonable Functions. Scientific Reports. Aug. 4, 2015; 13 pages.

Helinski et al., A Physical Unclonable Function Defined Using Power Distribution System Equivalent Resistance Variations. DAC'09. Jul. 16-31, 2009; pp. 676-681.

Herder et al., Physical Unclonable Functions and Applications: A Tutorial. Proceedings of the IEEE. Aug. 2014;102(8):1126-41.

Kavehei et al., mrPUF: A Memristive Device based Physical Unclonable Function. Department of Electrical and Electronic Engineering, The University of Melbourne, Victoria 3010, Australia. Feb. 9, 2013; 4 pages.

Potteiger et al., A One Zener Diode, One Memristor Crossbar Architecture for a Write-Time_Based PUF. Security and Fault Tolerance (SAF-T) Research Group, Department of Electrical Engineering and Computer Science, Vanderbilt University, Nashville, TN. Aug. 2, 2015. 2015 IEEE 58$^{th}$ International Midwest Symposium on Circuits and Systems (MWSCAS). 2015; 4 pages.

Rahman et al., An Aging-Resistant RO-PUF for Reliable Key Generation. IEEE Transactions on Emerging Topics in Computing. Sep. 2016; 4(3):335-348.

[No Author Listed], Secure IoT On-Chip Security Scheme Based on Silicon Fingerprint Whitepaper, Jul. 18, 2017.

Teo Han Loong et al., Effect of different memristor window function with variable random resistance on the performance of memristor-based RO-PUF. 2016 International Conference on Advances in Electrical, Electronic and System Engineering. Nov. 14-16, 2016. Putrajaya, Malaysia. IEEE. 2016; pp. 445-450.

Tuyls et al., Read-Proof Hardware from Protective Coatings. Philips Research Laboratories, The Netherlands. 2006; 15 pages.

Yoshikawa et al., Tamper resistance evaluation of PUF in environmental variations. Meijo University, Dept. of Information Engineering, Nagoya, Japan. IEEE. Dec. 14, 2016; pp. 119-121.

Zheng et al., Design Impedance Mismatch Physical Unclonable Functions for IoT Security. Jan. 24, 2017. Active and Passive Electronic Components. 2017; Article ID 4070589; 8 pages.

* cited by examiner

600 providing a supply voltage to a first resistor and a second resistor electrically connected to the first resistor, wherein the first resistor has a first impedance value and the second resistor has a second impedance value.
601 generating, using an analog-to-digital converter, a first plurality of bits representing a voltage signal that indicates a ratio of the first impedance value and the second impedance value.
603 generating a PUF value based on the first plurality of bits.
605

IMPEDANCE-BASED PHYSICAL UNCLONABLE FUNCTION

FIELD OF THE DISCLOSURE

The present application relates to analog physical unclonable functions (PUFs) systems and methods.

BACKGROUND

A physical unclonable function (PUF) is a hardware component which generates an output whose value depends on unique and/or random physical properties of the component. Even tightly controlled manufacturing processes will include variations of some types of hardware components. Thus, even when hardware components are intended to have identical properties, these variations result in components with unique properties.

SUMMARY OF THE DISCLOSURE

According to various aspects of the present application, systems and methods for providing a soft-decoding physical unclonable function are provided. According to one embodiment, PUF circuitry includes circuit elements with impedance values that are used to generate a PUF value. For example, one or more resistors may be connected to a voltage source. The resistors may generate a resulting voltage signal that is measured and indicates a ratio of the impedance values of the resistors. Due to manufacturing variations, each impedance value may be unique, such that the impedance values may be used to provide a unique number sequence. Each ratio value may be converted into a single bit or multi-bit digital value through digitization, for example with a comparator and/or an analog to digital converter, and the series of digital values may represent or be used to generate a unique number sequence.

According to one aspect of the present application, a system for providing an impedance based PUF value is provided. The system includes a first resistor having a first impedance value, a second resistor having a second impedance value, wherein the second resistor is electrically connected to the first resistor, an analog-to-digital converter (ADC) electrically connected to the first resistor and the second resistor, wherein the ADC is configured to generate a first plurality of bits representing a voltage signal that indicates a ratio of the first impedance value and the second impedance value, and processing circuitry configured to generate a PUF value based on the first plurality of bits.

According to one aspect of the present application, a method for providing an impedance based PUF is provided. The method includes providing a supply voltage to a first resistor and a second resistor electrically connected to the first resistor, wherein the first resistor has a first impedance value and the second resistor has a second impedance value, generating, using an analog-to-digital converter, a first plurality of bits representing a voltage signal that indicates a ratio of the first impedance value and the second impedance value, and generating a PUF value based on the first plurality of bits.

According to one aspect of the present application, a system for providing an impedance based PUF value is provided. The system includes a processor package comprising: a first resistor pair having a first impedance ratio, a second resistor pair having a second impedance ratio, an analog-to-digital converter (ADC) electrically connected to the first resistor pair and the second resistor pair, wherein the ADC is configured to generate one or more bits representing a voltage signal that indicates a difference between the first impedance ratio and the second impedance ratio, and processing circuitry configured to generate a PUF value based on the one or more bits.

BRIEF DESCRIPTION OF DRAWINGS

Various aspects and embodiments of the disclosure will be described with reference to the following figures. It should be appreciated that the figures are not necessarily drawn to scale. Items appearing in multiple figures are indicated by the same reference number in all the figures in which they appear.

FIG. 6 illustrates a method for providing an impedance based physically unclonable function (PUF) according to an embodiment of the present application.

DETAILED DESCRIPTION

Figure 1:
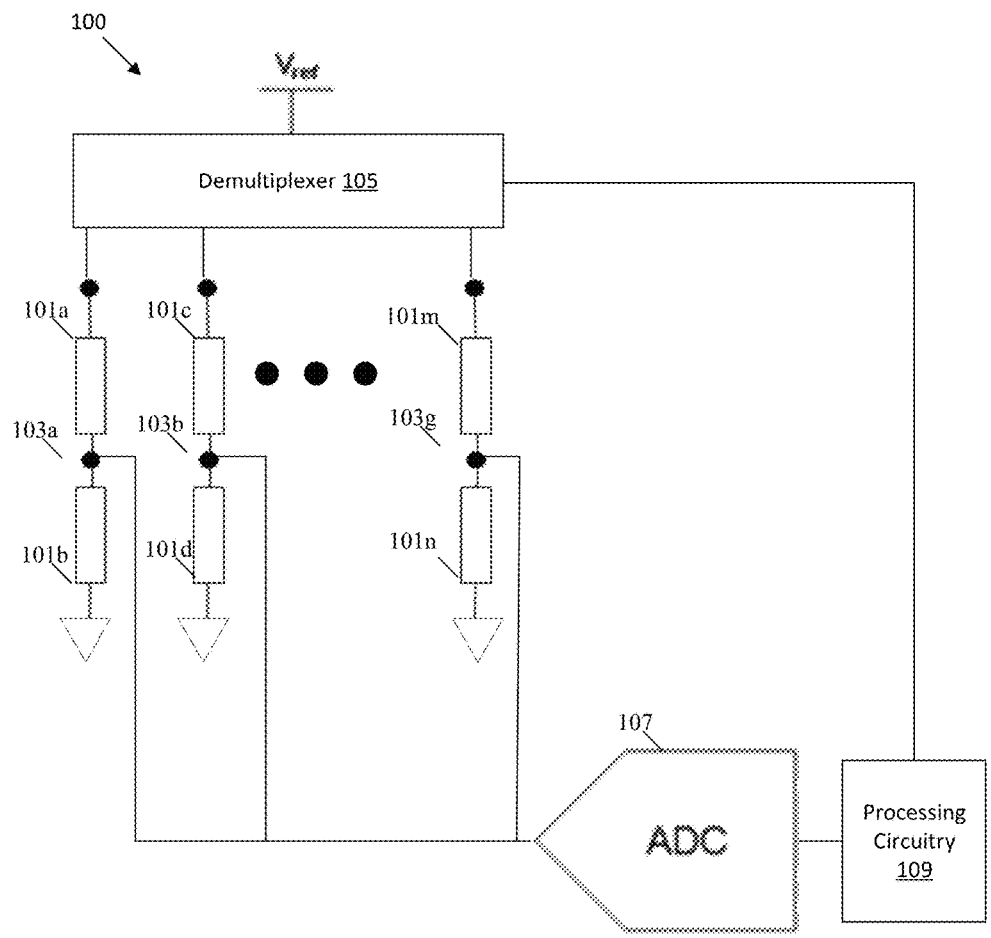
FIG. 1 illustrates a soft-decoding physical unclonable function (PUF) circuit according to an embodiment of the present application.

Aspects of the present application provided systems and methods for generating and/or storing unique values which may be used as keys, device identifiers for security purposes, or for other reasons. Traditionally, unique values, such as keys or unique identifiers, are stored in non-volatile memory of devices. One approach involves storing unique values in one time programmable (OTP) memory. However, OTP memory may be susceptible to imaging attacks, such that an adversary can visually inspect the memory to learn the unique value, thus reducing the usefulness of the unique identifier as a security measure. Another approach is to use a hard-decoding physical unclonable function (PUF), a PUF that outputs only a one-bit quantization of an underlying signal. However, such hard-decoding PUFs rely on digital and/or binary logic that discards substantial portions of underlying information that is used to generate the PUF. At least some hard-decoding PUFs are also sensitive to variations in temperature, device aging, and other sources of noise, thus requiring error correcting codes to correct for bits that are flipped due to noise. Some aspects of the present application provide analog physical unclonable functions (PUFs) which are configured to generate signals based on ratios of impedances of the PUF. Soft-decoding PUFs may use a higher resolution than one bit to preserve a substantial portion of an underlying analog signal, rather than using analog variations to generate a random binary outcome. Soft-decoding PUFs may employ a soft-decoding strategy using soft information (e.g., from a Gaussian distribution) and potentially yield more than 1 bit per comparison or measurement. Soft-decoding PUFs may include analog PUFs and be implemented using combinations of analog and digital components, for example by utilizing analog circuit signals that are digitized to form PUF values.

According to an aspect of the application, a PUF implementation may utilize analog circuit signals, such as signals based on impedance mismatches, that are digitized to form PUF values. The soft-decoding PUF circuitry according to non-limiting aspects of the present application may generate PUF values by measuring voltage signals based on impedance value mismatches. According to some aspects, systems and methods are provided for providing an impedance based PUF. In some embodiments, a PUF value may be generated by providing a supply voltage to a first resistor and a second resistor electrically connected to the first resistor, wherein the first resistor has a first impedance value and the second resistor has a second impedance value; generating, using an analog-to-digital converter, a first plurality of bits representing a voltage signal that indicates a ratio of the first impedance value and the second impedance value; and generating a PUF value based on the first plurality of bits.

Aspects of the present application may provide various benefits, including addressing shortcomings of alternative approaches to generating unique numbers. For example, soft-decoding PUF implementations may retain substantial information from the underlying random characteristics of the PUF circuitry. The soft-decoding PUF circuitry described according to various aspects of the present application may exhibit greater resiliency to temperature fluctuations and/or voltage/current fluctuations than alternative approaches, and may exhibit greater stability over the useful lifetime of the device. Furthermore, the soft-decoding PUF circuitry described herein according to at least some embodiments does not require error correcting codes and may draw virtually no power when not in use. In such embodiments, error correcting codes may not be required since all or a portion of the bit(s) in an output PUF value may be generated with sufficient stability to make flipped bits unlikely. However, error correcting codes may optional be used. It should be appreciated that not all embodiments necessarily provide all such benefits, and that benefits beyond those explicitly described above may also be realized with one or more embodiments of the present application.

FIG. 1 illustrates a soft-decoding physical unclonable function (PUF) circuit 100 according to an embodiment of the present application. FIG. 1 illustrates resistors 101a, 101b, 101c, 101d, . . . , 101m, and 101n, resistor pairs 103a, 103b, . . . , and 103g, demultiplexer 105, analog-to-digital converter 107, and processing circuitry 109. The soft-decoding PUF circuit 100 may be operable to generate a value representing a soft-decoding PUF in accordance with systems and methods described herein. In some embodiments, the soft-decoding PUF value is based on one or more impedance values of circuit components (e.g., the resistors 101a-101n) and/or a ratio of impedance values.

The resistors 101a-101n may be any suitable electrical resistors. For example, the resistors 101a-101n may be carbon resistors, metal oxide resistors, polysilicon resistors, film resistors, and/or any other suitable type of resistor. Film resistors may include metal film resistors, thin film resistors, and/or thick film resistors. The resistors 101a-101n may be arranged in an array, for example on a shared substrate and/or within a shared package. In some embodiments, the resistors are physically dispersed throughout a printed circuit board, package, and/or device.

In some embodiments, capacitors may be used in place of the resistors 101a-101n. It should be appreciated that any circuit element(s) having an impedance value may be used in lieu of or in addition to the resistors 101a-101n without departing from the scope of the present application. Thus, the resistors 101a-101n may more generally be represented as impedances 101a-101n in some embodiments.

It should also be appreciated that the resistors 101a-101n may be any suitable circuit and/or combination of circuit elements. The resistors 101a-101n may be equivalent impedances that represent one or more circuit elements as a single circuit element with a substantially equivalent impedance for clarity. For example, the resistors 101a-101n may each include one or more resistors connected in series and/or parallel to create a suitable impedance. In some embodiments, the resistors 101a-101n may be replaced with circuit elements for measuring ratios of other circuit element characteristics, such as threshold voltages and leakage currents. For example, transistors may be configured for measuring and/or computing ratios of such characteristics.

In some embodiments, the resistors 101a-101n may be intended to have the same impedance value as each other. However, manufacturing process variations may create variations in the actual impedance values of the resistors 101a-101n. In general, each impedance value may deviate from some nominal (or target) impedance value. In some embodiments, all or a portion of the resistors may have a different respective nominal impedance value. For example, each of the resistors 101a-101n may have a first nominal impedance value and be paired with a resistor having a second nominal impedance value that differs from the first nominal impedance value by a constant amount, a scale factor, or by any other suitable function.

It is not required that each of the resistors 101a-101n be configured to have the same nominal impedance value, and, in some embodiments, one or more of the resistors 101a-101n may be configured to encode a predetermined impedance value. For example, any of the resistors 101a-101n may have resistive material removed, which may be referred to as being trimmed, to encode a predetermined impedance value. Trimming a resistor may include forming a kerf (or removing a kerf) in the resistive material of the resistor. Such a kerf may be formed, for example using a laser. The characteristics of the kerf and the remaining resistive material may result in the resistor having a predetermined impedance value. Predetermined impedance values may be used to encode predetermined values to be generated and/or recovered by an ADC and other circuitry used to generate PUF values. Predetermined impedance values may be used, for example, as an alternative to one time programmable memory for storing identification numbers and other predetermined quantities. An example of a trimmed resistor is described with reference to FIG. 7.

In the example of FIG. 1, the resistors 101a-101n are arranged into resistor pairs 103a-103g. In the non-limiting example illustrated, each resistor pair 103a-103g includes a first and second resistor connected in series. For example, the resistor pair 103a includes the resistor 101a and the resistor 101b. In the example of FIG. 1, each of the n resistors is paired with exactly one other resistor, therefore the number, g, of resistor pairs 103a-103g is one half of the number of resistors 101a-101n. It should be appreciated that any suitable, arbitrary numbers of resistors and/or resistor pairs may be utilized. Although the resistors 101a-101n are depicted in pairs 103a-103g, it should be appreciated that other arrangements are possible and that pairs of resistors may be selected using control signals and/or switches.

One or more, and in some situations each, of the resistor pairs 103a-103g may be selectively connected to a voltage source by the demultiplexer 105. In each of the resistor pairs 103a-103g, one resistor may be connected to the supply voltage, and one resistor is directly connected to electrical ground. The voltage at points between the resistors in each of the pairs 103a-103g therefore represents a ratio of the impedance values of each resistor in each pair. It should be appreciated that the ratio of the impedance values may include ratios with terms more complex than a simple ratio of only two quantities.

The demultiplexer 105 may be operated by control signals from the processing circuitry 109. In some embodiments, in response to the control signals, the demultiplexer 105 connects one of the resistor pairs 103a-103g at a time to the supply voltage. This allows each of the resistor pairs 103a-103g to independently generate voltage signals that may be used to generate a PUF value. In further embodiments, the demultiplexer 105 may be used to select multiple pairs of resistors at a same time, for example to generate a single voltage signal using multiple pairs of resistors. In some embodiments, two voltage signals may be used as differential inputs to the ADC 107. In some embodiments, the ADC is configured to generate one or more bits representing a digital voltage signal that indicates a difference between a first impedance ratio corresponding to a first resistor pair 103a-103g and an impedance ratio corresponding to a second resistor pair 103a-103g. In such embodiments, one of the resistor pairs 103a-103g may be selected as a reference pair that is compared to each of the other resistor pairs 103a-103g. In some such embodiments, the ADC 107 may be configured as a comparator with a single bit output. Thus, a single bit decoding, or hard decoding, may be performed on impedance ratios.

The ADC 107 receives a voltage signal from any of the resistor pairs 103a-103g. The ADC 107 digitizes the voltage signal using any suitable resolution, including 1, 2, 4, 8, 10, 12, 14, 16, 18, or 24 bits, as non-limiting examples. In some embodiments, the range of the ADC may be centered on the voltage signal that would be generated if the resistors in a pair matched their nominal impedance values to the limits of the precision of the ADC. For example, if the resistors 101a-101n in each resistor pair 103a-103g were meant to be paired to have identical nominal impedance values, the range of the ADC may be centered on one half of the supply voltage, $V_{ref}$ in the example of FIG. 1. In some embodiments, the range of the ADC is configured based on an expected statistical distribution of the voltage signals generated by each of the resistor pairs 103a-103g. In some embodiments, the range of the ADC 107 is configured to allow for processing of the voltage signal prior to digitization. For example, the voltage signals may be amplified or multiplied by a gain to change the expected distribution of values.

The processing circuitry 109 is configured to transmit control signals to the demultiplexer 105. The control signals may be used to determine which of the resistor pairs 103a-103g are connected to the supply voltage. Once a resistor pair is selected and the digital voltage signal is generated by the ADC 107, the processing circuitry 109 generates a PUF value based on the bits generated by the ADC 107. In some embodiments, the processing circuitry may select a portion of the bits generated by the ADC 107. For example, the processing circuitry may select the four, six, eight, ten, or more most significant bits of the ADC output. The processing circuitry may be configured to select a number of bits that is likely to remain stable between PUF readings. For example, impedance ratios may be relatively stable under temperature variations but subject to other sources of noise that may cause variations in the least significant bits of an ADC output. In some embodiments, the processing circuitry may execute a provisioning phase. The digital voltage signals obtained from each of the resistor pairs 103a-103g may be compared to a threshold in the ADC 107 output range in order to determine if the digital voltage signal is suitably stable. In some embodiments, the resistor pairs 103a-103g that correspond to stable digital voltage signals may be stored for later PUF value generation. In some embodiments, the resistor pairs 103a-103g that do not correspond to stable digital voltage signals may be excluded from later PUF value generation.

In some embodiments, the processing circuitry 109 combines multiple bits generated by the ADC 107 from voltage signals generated by multiple resistor pairs 103a-103g. In some embodiments, the processing circuitry 109 generates a PUF value by concatenating bits representing voltage signals generated by at least two of the resistor pairs 103a-103g. In some embodiments, different PUF values may be generated using one or more different sets of the resistor pairs 103a-103g. For example, sets of the resistor pairs 103a-103g may be selected in response to an input value, such as a challenge meant to receive a certain response from the device. As a further example, a first challenge input may indicate that only resistor pairs 103a-103d are used to generate the PUF value, and a second challenge input different from the first may indicate that only resistor pairs 103d-103g are used to generate the PUF value.

The processing circuitry 109 may perform any suitable mathematical operation on the bits generated for each pair of resistors 103a-103g. In some embodiments, the average value of the digital voltage signals is calculated and the PUF value is based on the average. For example, an indication of the deviation from the average may be used to represent each of the resistor pairs 103a-103g used in the PUF value. In some embodiments, the processing circuitry 109 may compute a weighted sum of the digital voltage signals for each of the resistor pairs 103a-103g. The processing circuitry 109 may also generate the PUF value by computing any arbitrary function(s) on the digital voltage signals. It should be appreciated that the foregoing methods of combining voltage signal outputs are provided by way of non-limiting example and any suitable mathematical operation or combination of the voltage signal outputs may be utilized to generate a PUF value without departing from the scope of the present application.

The processing circuitry 109 may use the demultiplexer 105 to select the resistor pairs 103a-103g used to generate a PUF value in any suitable order. In some embodiments, each of the resistor pairs 103a-103g may be connected to the supply voltage and sampled with the ADC 107 in a sequential order (e.g., from 103a to 103g or vice versa). In some embodiments, the processing circuitry 109 may sample the resistor pairs 103a-103g in a predetermined order. For example, an ordering may be retrieved from a memory or from a communications interface. In some embodiments, the processing circuitry may access a mapping of inputs (e.g., challenge words, or integers) to orderings of the resistor pairs 103a-103g in order to determine an ordering of the bits in the PUF value. In some embodiments, the processing circuitry may sample the voltage signals for any of the resistor pairs 103a-103g in an order determined by one or more digital voltage signals. For example, the processing circuitry may select the resistor pair 103a and then select the resistor pair 103b next if the voltage signal output begins with 0b000 or the resistor pair 103c next if the voltage signal output begins with 0b001. In some embodiments, all or a portion of a digital voltage signal may be used to index into a list of sampling orders. For example, the k most significant bits of 'master' resistor pair(s), which may encode predetermined value(s) (e.g., through trimming), may be used to select one of two to the power of k possible orders for sampling the voltage signals of the resistor pairs 103a-103g. As a non-limiting illustrative example of such embodiments, the first three bits of the resistor pair 103a may be used to select one of eight possible orders for sampling the voltage signals from the resistor pairs 103a-103g. In some embodiments, the processing circuitry may sample the voltage signals from any of the resistor pairs 103a-103g in a different order than the voltage sample outputs are combined, and it should be appreciated that the methods for ordering the sampling of the resistor pairs 103a-103g described herein may be applied to combining the digital voltage signals obtained from resistor pairs 103a-103g sampled in any order.

In some embodiments, the processing circuitry 109 may perform mathematical operations on the digital voltage signals to obtain a suitable distribution of digital voltage signals. For example, the processing circuitry 109 may use a cumulative distribution function, or an approximation thereof, to transform the digital voltage signals to a substantially uniform random variable.

The processing circuitry 109 may output the PUF value generated using the resistor pairs 103a-103g. The PUF value may be transmitted to any suitable destination, used to store, encrypt, and/or obfuscate a secret value, used to authenticate a device, and/or for any other purpose suitable for a PUF.

Figure 2:
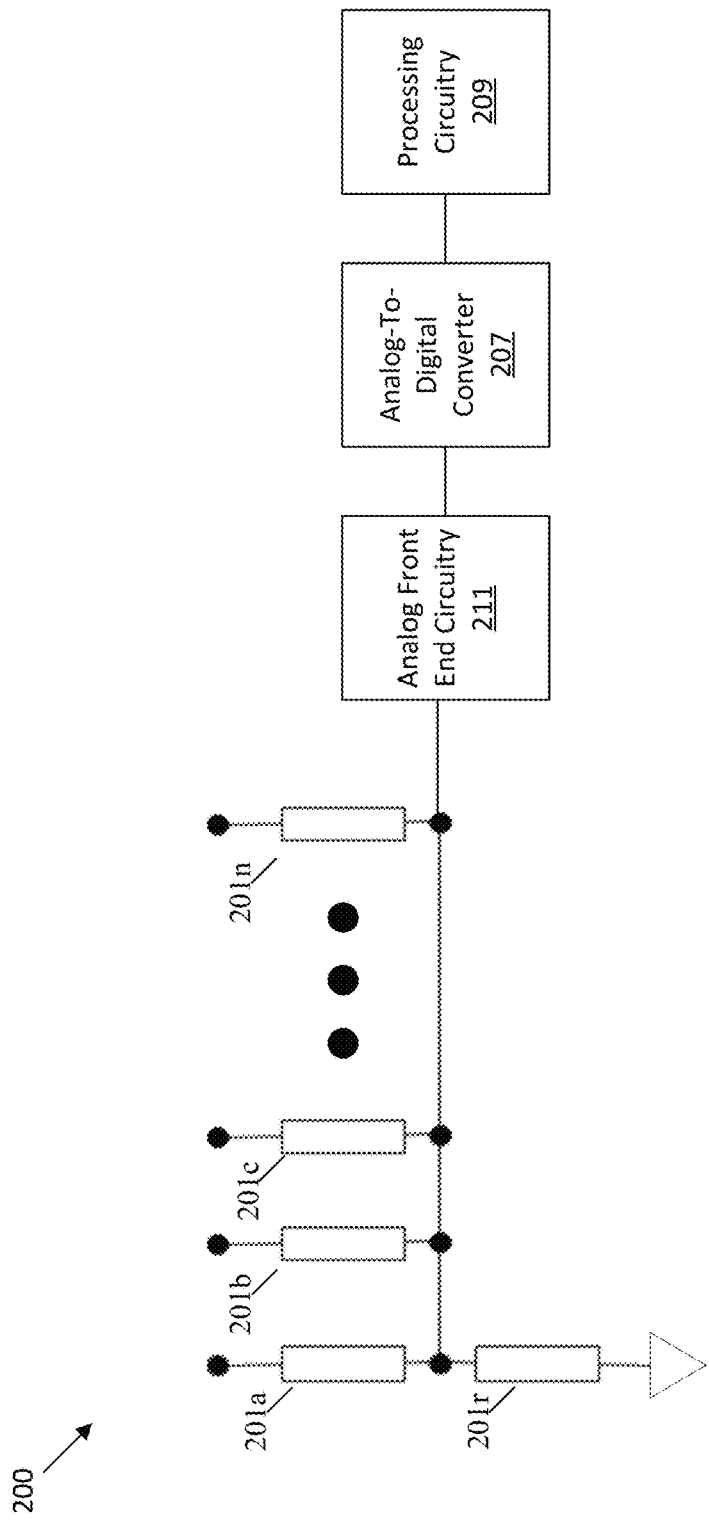
FIG. 2 illustrates a soft-decoding PUF according to an alternative embodiment of the application, employing a common reference impedance.

FIG. 2 illustrates soft-decoding PUF circuitry 200 according to an embodiment of the application, employing a common reference impedance (201r). FIG. 2 illustrates resistors 201a, 201b, 201c, . . . , 201n, and 201r, analog front end circuitry 211, analog to digital converter 207, and processing circuitry 209. The soft-decoding PUF circuitry 200 may be operable to generate a value representing a soft-decoding PUF in accordance with systems and methods described herein. In some embodiments, the soft-decoding PUF value is based on one or more ratios of impedance values to a reference impedance value.

In the example of FIG. 2, the resistors 201a-201n are connected to the reference resistor 201r, which is the only resistor connected to ground. The resistors are arranged to generate voltage signals that indicate a ratio of one or more impedance values from the resistors 201a-201n to the reference impedance value of the reference resistor 201r. It should be appreciated that more than one reference resistor may be provided without departing from the scope of the present application.

Voltage signals generated by the resistors 201a-201n and 201r are input to the analog front end circuitry 211. The analog front end circuitry 211 may include any suitable circuitry for processing the analog voltage signals. For example, the analog front end circuitry 211 may buffer, amplify, and/or filter the voltage signals from the resistors 201a-201n and/or 201r. In some embodiments, the analog front end circuitry 211 may process, such as by applying a gain, the voltage signals to obtain a suitable distribution of voltage signals. For example, the analog front end circuitry 211 may use a cumulative distribution function, or an approximation thereof, to transform the digital voltage signals to a substantially uniform random variable. In some embodiments, the analog front end circuitry 211 may apply a pedestal signal to determine whether the digital voltage signal is within a threshold distance of a boundary in the output of the ADC 207. For example, in such embodiments, a PUF value may be considered unstable and/or rejected when the pedestal signal causes a flipped bit in the output of ADC 207.

Figure 3:
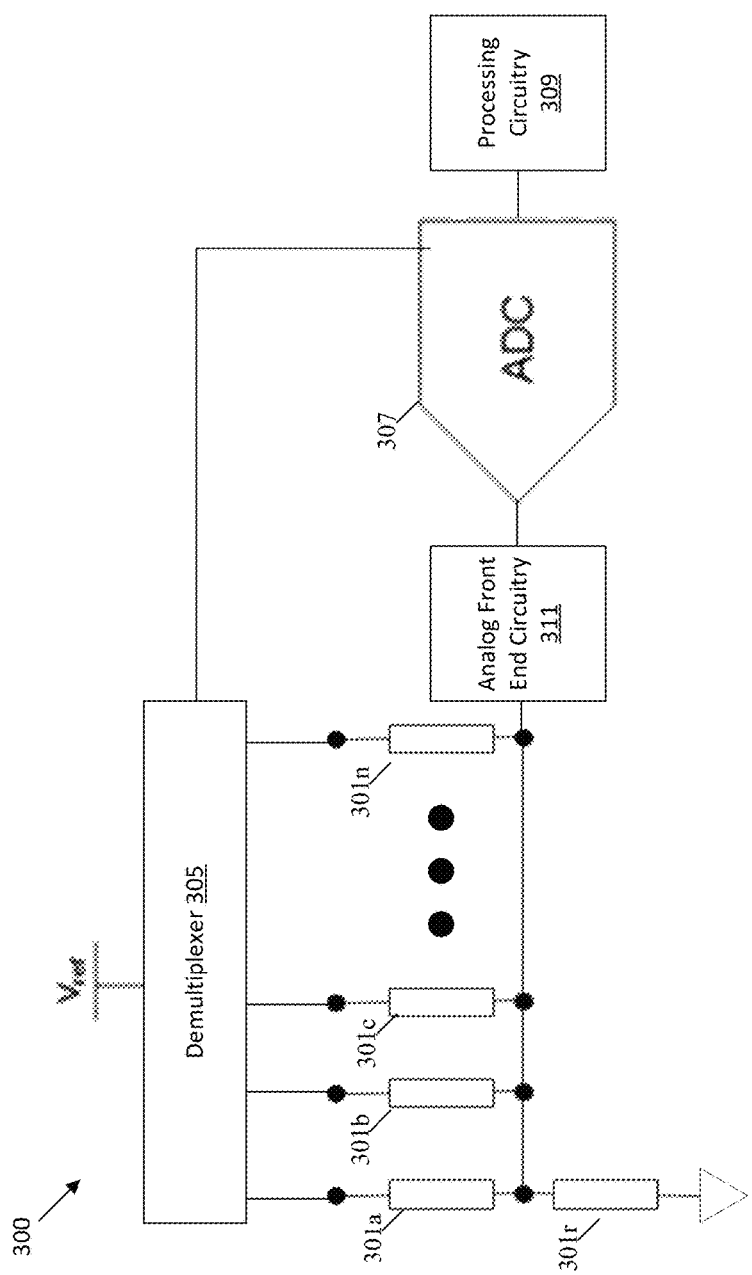
FIG. 3 is a circuit schematic of the soft-decoding PUF of FIG. 2.

FIG. 3 is a circuit schematic of the soft-decoding PUF circuit of FIG. 2. FIG. 3 illustrates resistors 301a, 301b, 301c, 301n, and 301r, demultiplexer 305, analog front end circuitry 311, ADC 307, and processing circuitry 309. The soft-decoding PUF circuitry 300 may generate a soft-decoding PUF value as was described with reference to FIG. 2. In contrast with FIG. 1, the circuit 300 of FIG. 3 voltage signals are generated that indicate a ratio between a selected impedance value and a common reference impedance value.

As in FIG. 1, the processing circuitry 309 generates control signals for controlling the demultiplexer 305. Each of the resistors 301a-301n may be connected to a supply voltage through the demultiplexer 305. The resistors 301a-301n may be selected in any suitable order, and one or more of the resistors 301a-301n may be selected at once.

Connecting one or more of the resistors 301a-301n to the supply voltage generates a voltage signal that may be operated on by the analog front end circuitry 311, subsequently digitized by the ADC 307, and subsequently operated on by processing circuitry 309 as was described with reference to FIG. 1. The processing circuitry may operate as was described with reference to FIGS. 1 and 2.

Figure 4:
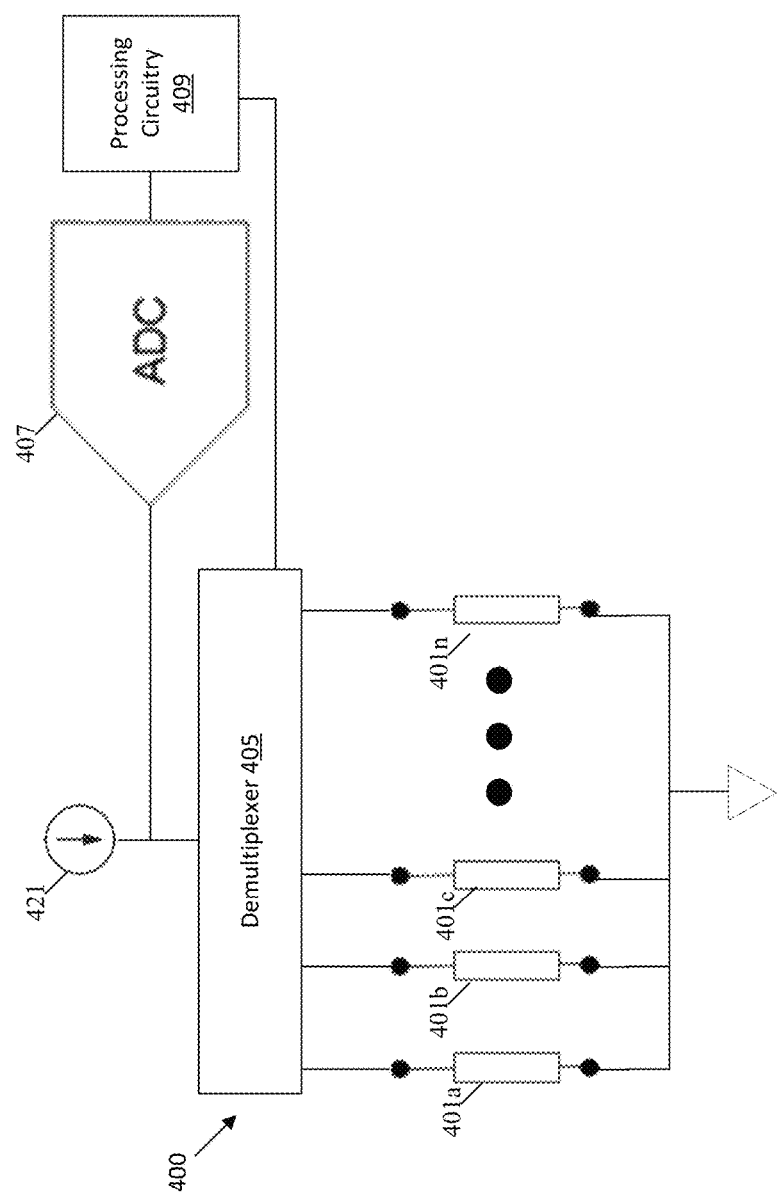
FIG. 4 is a circuit schematic of a soft-decoding PUF circuit according to an alternative embodiment of the application, determining individual impedances.

FIG. 4 is a circuit schematic of a soft-decoding PUF circuit 400 according to an alternative embodiment of the application, determining individual impedances. FIG. 4 illustrates resistors 401a, 401b, 401c, and 401n, demultiplexer 405, ADC 407, processing circuitry 409, and current source 421. The soft-decoding PUF circuit 400 may generate PUF values based on voltage signals indicating individual impedance values.

The current source 421 may be any suitable current source. In some embodiments, the current source 421 is controlled by the processing circuitry 409. For example, the processing circuitry 409 may be connected to a digital-to-analog converter that is configured to control the output current levels.

In the example of FIG. 4, the demultiplexer 405 may connect each of the resistors 401a-401n to the current source 421. The ADC 407 then measures the voltage drop created by the current across the selected resistor. The measured voltage drop is equal to the product of the impedance value of the selected resistor(s) and the current. When the same current value is applied to each of the resistors 401a-401n, differences in the voltage signals will indicate differences in the impedance values of the resistors 401a-401n. In some embodiments, the current value may be known and the impedance values of the resistors 401a-401n measured directly.

In some embodiments, the voltage drop across each resistor may be measured using a differential pair connected on either side of the resistor and a differential input of the ADC. In some embodiments, connections between the resistors 401a-401n and the ADC 407 may be multiplexed to select a single resistor to measure the voltage drop across the selected resistor. It should be appreciated that different circuits for measuring the voltage drop across resistors may be employed without departing from the scope of the application.

As was described with reference to earlier figures, the outputs of the ADC 407 may be combined by the processing circuitry 409 in any suitable way to generate a PUF value. Any suitable mathematical combination of the impedance values of the resistors 401a-401n, including weight sums, an average, and arbitrary functions, may be computed. For example, ratios may be generated for each individual impedance value relative to the average of all of the individual impedance values.

Figure 5A:
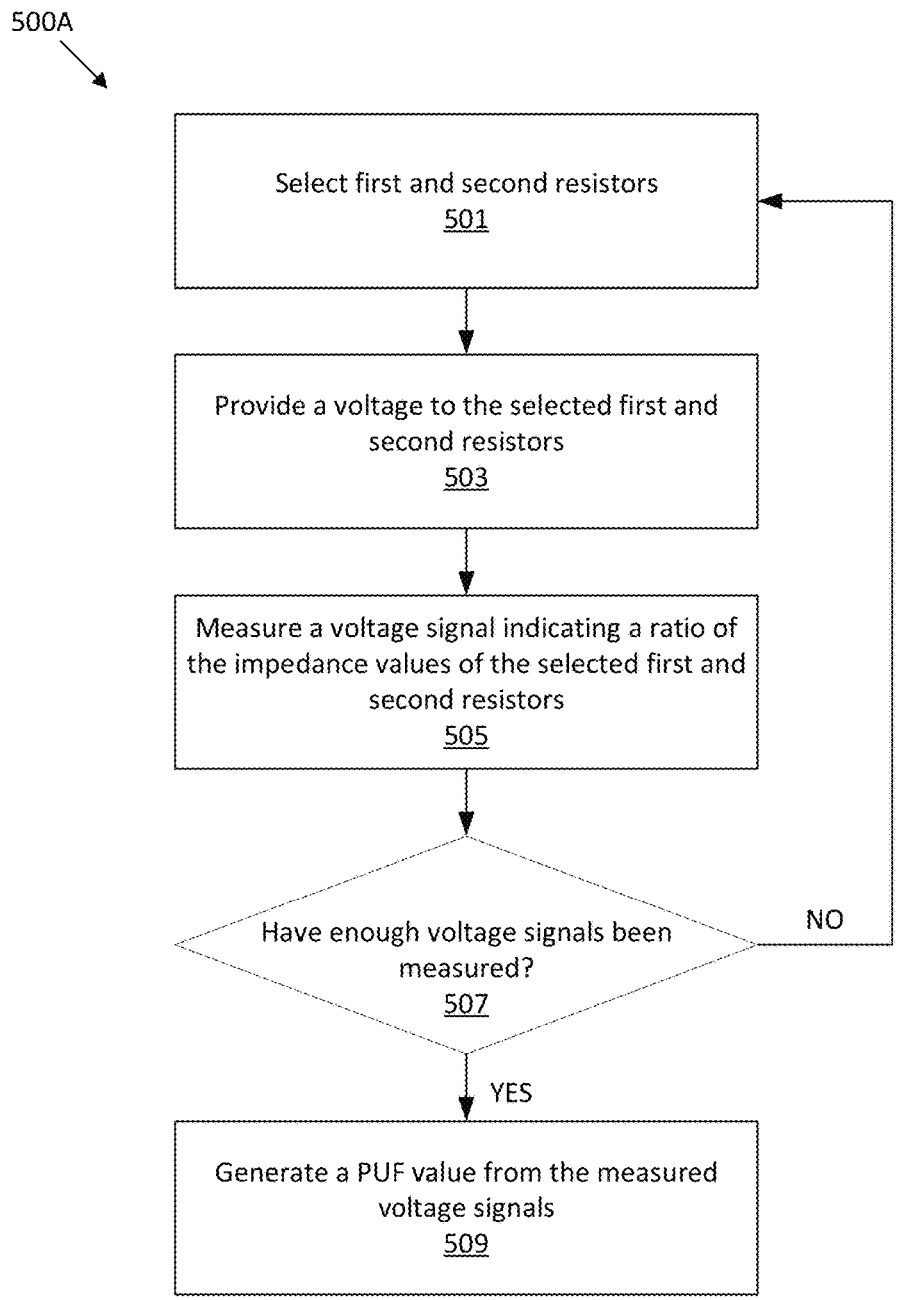
FIGS. 5A-5C are flowcharts illustrating methods of operating a soft-decoding PUF circuitry, such as the soft-decoding PUF circuitry of FIG. 3, according to an embodiment of the present application.

FIG. 5A is a flowchart illustrating a method 500A of operating a soft-decoding PUF circuit, such as the soft-decoding PUF circuitry of FIG. 3, according to an embodiment of the present application. The method 500A may be executed by the circuits 100 and 300 including the processing circuitry 109 and 309.

The method 500A begins at act 501 where first and second resistors are selected. In some embodiments, the first and second resistors are part of a same pair of resistors, for example as was described with reference to FIG. 1. In some embodiments, the first and second resistors may be selected from a plurality of resistors. For example, any two of the resistors in the circuit described with reference to FIG. 4 may be selected. In further embodiments, one of the first and second resistors may be a reference resistor that is selected each time performing the act 501, for example as was described with reference to FIG. 3.

In some embodiments, the first and second resistors are selected based on any suitable order. In some embodiments, the resistors are selected according to a sequential and/or predetermined order, which may be retrieved from a memory or from a communications interface. In some embodiments, the resistors may be selected based on a challenge input. In some embodiments, resistors may be selected based on one or more voltage signals. For example, the initial first and second resistors selected may be master resistors that generate a voltage signal used to determine subsequent resistor selections.

At act 503, a voltage is provided to the selected first and second resistors. A demultiplexer or any suitable switch may be used to connect the selected resistors to the source of the voltage and/or apply a voltage across the selected resistor. In some embodiments, the second resistor is connected to the voltage supply through the first resistor and the two resistors divide the voltage. In some embodiments, the two resistors divide a total voltage drop across the two resistors.

At act 505, a voltage signal is measured indicating a ratio of the impedance values of the selected first and second resistors. The voltage signal may be measured by an ADC connected to the first and second resistors. In some embodiments, the ADC is connected between resistors connected in series. The first and second resistors may also be arranged in parallel.

In some embodiments, the voltage signal indicating a ratio of the impedance values of the selected first and second resistors may be used as a differential input to an ADC. In some embodiments, a second voltage signal indicating a ratio of the impedance values of a reference pair of resistors may be used as a second differential input to the ADC. In such embodiments, the ADC is configured to generate one or more output bits representing a difference between the first and second voltage signals and/or impedance ratios. In further embodiments, act 505 may be performed with a comparator and/or an ADC configured as a comparator.

At act 507, it is determined whether enough voltage signals have been measured. Any suitable number of voltage signals may be measured in order to generate a PUF value. The acts 501, 503, 505, and 507 are repeated until sufficiently many voltage signals are measured. At act 509, a PUF value is generated from all or respective portions of the measured voltage signals. Any suitable mathematical operation may be performed on the bits generated for each pair of resistors. In some embodiments, the average value of the digital voltage signals is calculated and the PUF value is based on the average. In some embodiments, a weighted sum of the digital voltage signals for each of the resistor pairs may be computed. The PUF value may also be generated by computing any arbitrary function(s) on the digital voltage signals. It should be appreciated that the foregoing methods of combining voltage signal outputs are provided by way of non-limiting example and any suitable mathematical operation or combination of the voltage signal outputs may be utilized to generate a PUF value without departing from the scope of the present application.

Figure 5B:
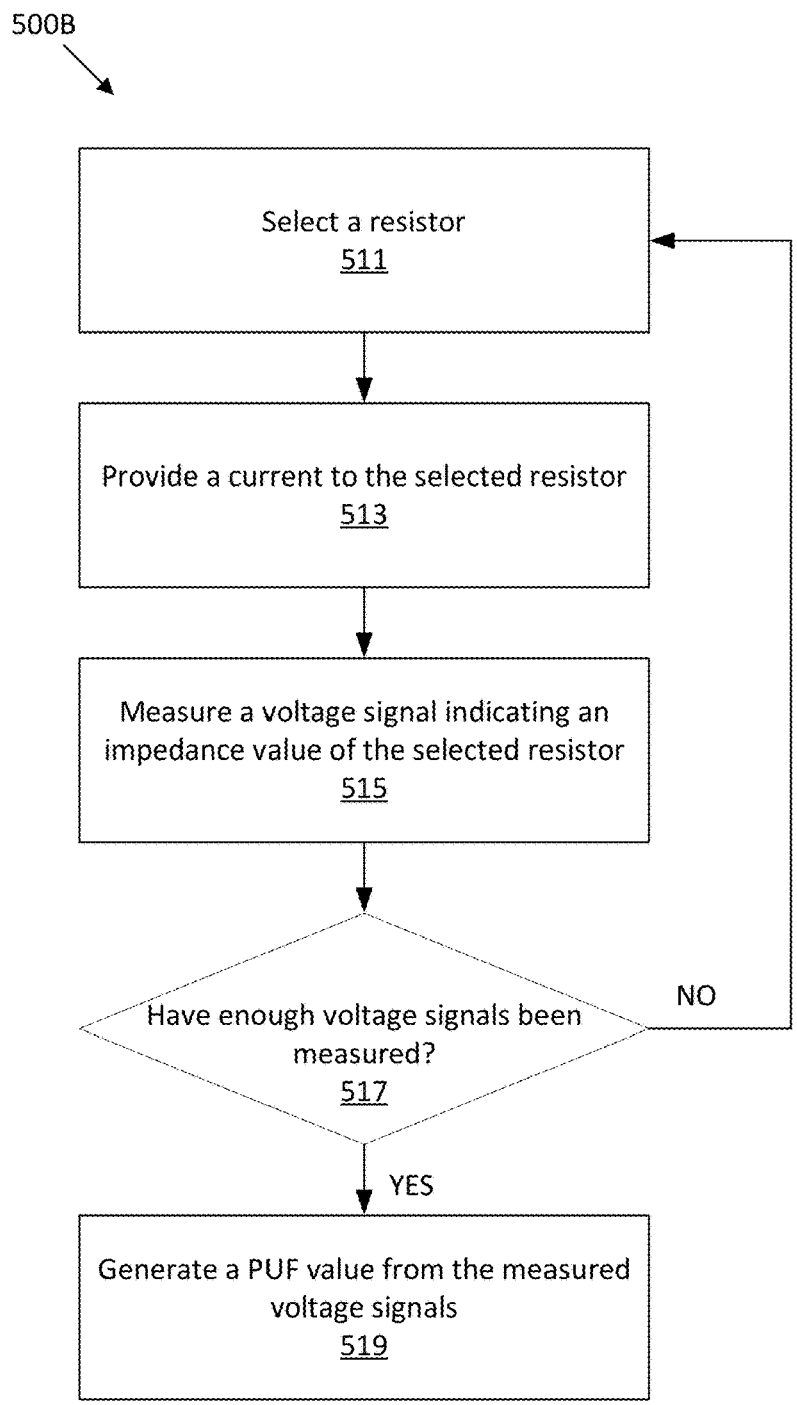

FIG. 5B is a flowchart illustrating a method 500B of operating a soft-decoding PUF circuit, such as the soft-decoding PUF circuitry of FIG. 4, according to an embodiment of the present application. The method 500B may be executed by the circuits 400 including the processing circuitry 409. In contrast to the method of FIG. 5A, the method 500B measures a voltage signal indicating the impedance value of a single resistor supplied with a current signal.

At act 511, a resistor is selected. The resistor may be any suitable resistor, such as any of the plurality of resistors in FIG. 4. At act 513, a current source is connected to the selected resistor. A demultiplexer or any suitable switch may be used to connect the selected resistors to the source of the current. The current may be controlled to be a known value. In some embodiments, the current value is constant for each iteration of the acts 511-517.

At act 515, a voltage signal indicating an impedance value of the selected resistor is measured. The measured voltage may be a voltage drop across the resistor, which is equal to the product of the impedance value of the selected resistor(s) and the current. When the same current level is applied to each selected resistor, differences in the voltage signals will indicate differences in the impedance values of the resistors. In some embodiments, the current value may be known and the impedance values of the resistors measured directly. In further embodiments, the voltage drop across each resistor may be measured using a differential pair connected on either side of the resistor and a differential input of the ADC.

At act 517, it is determined whether enough voltage signals have been measured. Any suitable number of voltage signals may be measured in order to generate a PUF value. The acts 511, 513, 515, and 517 are repeated until sufficiently many voltage signals are measured. At act 519, a PUF value is generated from the measured voltage signals. The voltage signals may be combined in any suitable manner, for example, using any of the methods described with reference to FIGS. 4 and 5A.

Figure 5C:
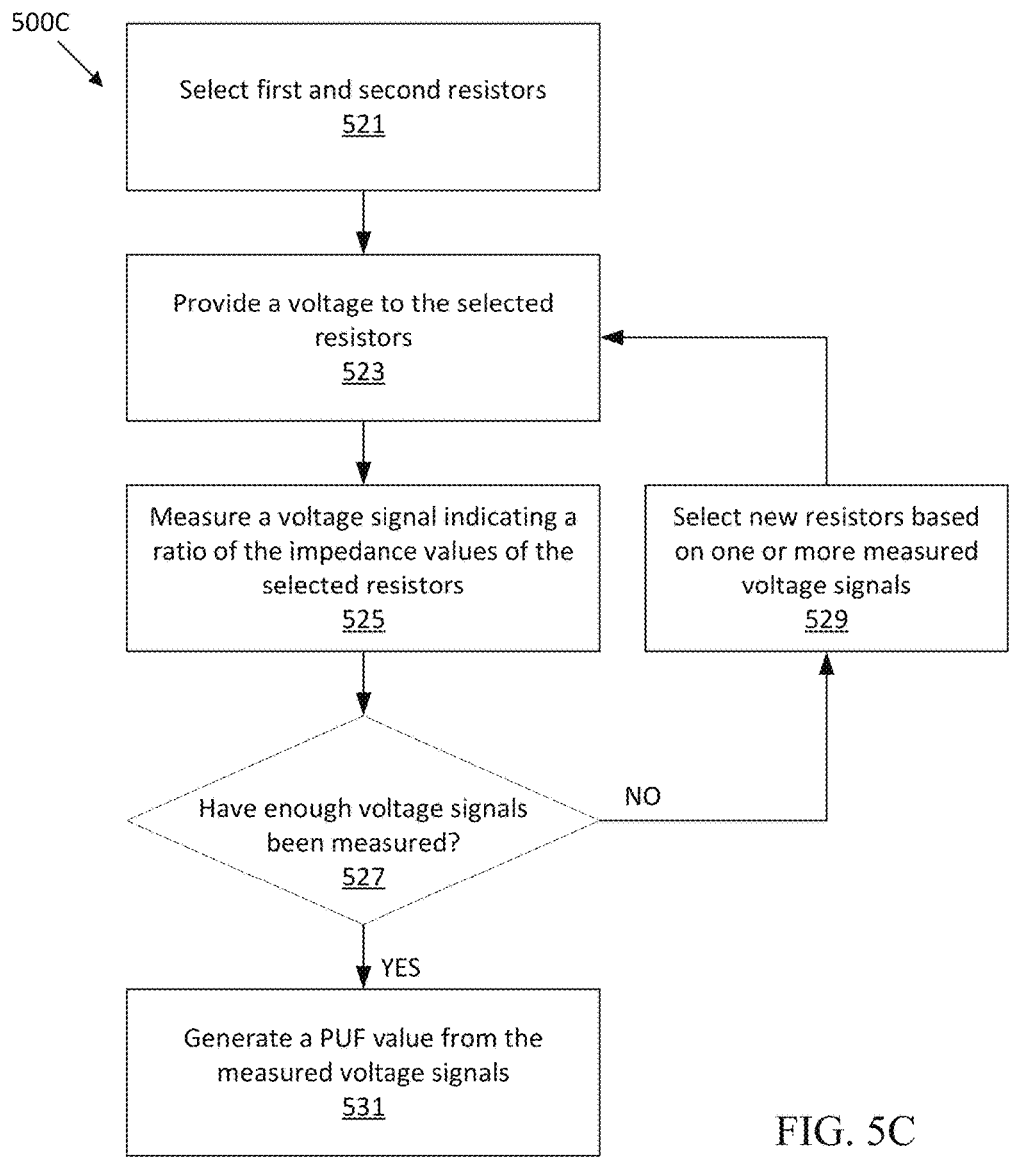

FIG. 5C is a flowchart illustrating a method 500C of operating a soft-decoding PUF circuit, such as the soft-decoding PUF circuitry of FIG. 4, according to an embodiment of the present application. The method 500C may be executed by the circuits 100 and 300 including the processing circuitry 109 and 309. In contrast to the method of FIG. 5C, the method 500C measures a voltage signal indicating a ratio of the impedance values of the impedance values of resistors selected based on previously measured voltage signals.

At act 521, first and second resistors are selected. The resistors may be any suitable resistors, such as any of the plurality of resistors in FIGS. 1-4. The resistors may also be selected in any suitable order, for example as was described with reference to FIGS. 1 and 5A. For example, the initial first and second resistors selected may be master resistors that generate a voltage signal used to determine subsequent resistor selections.

At act 523, a voltage is provided to the selected resistors. A demultiplexer or any suitable switch may be used to connect the selected resistors to the source of the voltage. In some embodiments, the second resistor is connected to the voltage supply through the first resistor and the two resistors divide the voltage.

At act 525, a voltage signal indicating a ratio of the impedance values of the selected resistors is measured. The voltage signal may be measured by an ADC connected to the first and second resistors. In some embodiments, the ADC is connected between resistors connected in series. The first and second resistors may also be arranged in parallel.

At act 527, it is determined whether enough voltage signals have been measured. Any suitable number of voltage signals may be measured in order to generate a PUF value. The acts 521, 523, 525, 527, and 529 are repeated until sufficiently many voltage signals are measured. At act 529, when additional voltage signals are to be measured, new resistors are selected based on one or more of the measured voltage signals. As was described with reference to FIG. 1, the selection of the new resistors may be based directly on the measured voltage signals, orderings retrieved from memory based on measured voltage signals, or by any suitable ordering.

At act 531, a PUF value is generated from the measured voltage signals. The voltage signals may be combined in any suitable manner, for example, using any of the methods described with reference to FIGS. 4 and 5A.

FIG. 6 illustrates a method 600 for providing an impedance based physically unclonable function (PUF) according to an embodiment of the present application. The method 600 may be executed by the circuits 100 and 300 including the processing circuitry 109 and 309.

At act 601, a supply voltage is provided to a first resistor and a second resistor electrically connected to the first resistor, wherein the first resistor has a first impedance value and the second resistor has a second impedance value. The first and second resistors may be selected from a plurality of resistors, for example, any of the resistors in FIGS. 1-4. In some embodiments, one or both of the first and second resistors may be trimmed resistors. In further embodiments, one or more predetermined values may be encoded in one or more impedance values by trimming one or more resistors.

At act 603, an analog-to-digital converter is used to generate a first plurality of bits representing a voltage signal that indicates a ratio of the first impedance value and the second impedance value. The voltage signal may be generated in response to providing a supply voltage to the resistors. In some embodiments, a demultiplexer may be used to provide the supply voltage to a subset of the resistors.

At act 605, a PUF value is generated based on the first plurality of bits. In some embodiments, a portion of the bits (e.g., the 1, 2, 4, 6, 8, or more most significant bits) are selected to generate the PUF value. In some embodiments, the PUF value may be based on a second plurality of bits representing a voltage signal that indicates a ratio of the first impedance value and a third impedance value, wherein the third impedance value corresponds to a third resistor electrically connected to the first resistor. In some embodiments, generating the PUF value may include concatenating all or portions of the first and second pluralities of bits. The PUF value may be generated in any suitable manner, for example any of those described with reference to any of the earlier FIGS.

In some embodiments, the method 600 may further include selecting, based on the first plurality of bits, an additional resistor having an additional impedance value, and generating an additional plurality of bits representing an additional voltage signal that indicates a ratio of the additional impedance value and the second impedance value. For example, these acts may be performed as was described with reference to FIGS. 1 and 5C.

Figure 7:
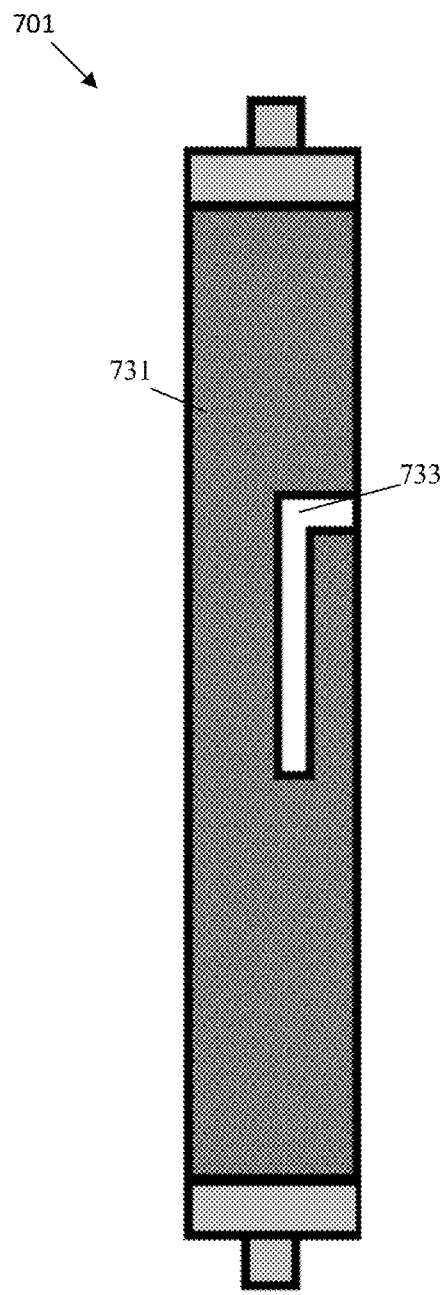
FIG. 7 illustrates an example of a resistor as may be employed in soft-decoding PUFs of the types described herein.

FIG. 7 illustrates an example of a resistor as may be employed in soft-decoding PUFs of the types described herein. FIG. 7 illustrates a trimmed resistor 701 that includes resistive material 731 and a kerf 733. The trimmed resistor 701, may be used for all or a portion of the resistors in any of the circuits described in FIGS. 1-4. The resistive material 731 may be any suitable material for providing resistance. The absence of resistive material 731 creates the kerf 733 and changes the impedance value of the resistor 701. A portion of the resistive material 731 may be removed to form the kerf 733. For example, the kerf 733 may be formed using a laser trimming process. The dimensions of the kerf 733 determines the value being encoded. It should be appreciated that suitable trimming may include kerfs that vary from the non-limiting example illustrated. For example, while FIG. 7 illustrates an embodiments including a single kerf, alternative embodiments may include multiple kerfs in the resistor. Also, removal of portions of any suitable shape, positioning, and patterning on the resistor may be implemented. Some resistive materials 731 will obscure the kerf 733 from visual inspection. Some resistive materials 731 will leave the kerf 733 visible, but the programmed/predetermined impedance is unlikely to be apparent from visual inspection.

The trimmed resistor 701 may be used to encode a predetermined value. Predetermined impedance values may be used to encode predetermined values to be generated and/or recovered by an ADC and other circuitry used to generate PUF values. Predetermined impedance values may be used, for example, as an alternative to one time programmable memory for storing identification numbers, an order for measuring impedance values/ratios of other resistors, and other predetermined quantities. Trimming may be performed per resistor, per die, or at any suitable process volume.

Figure 8:
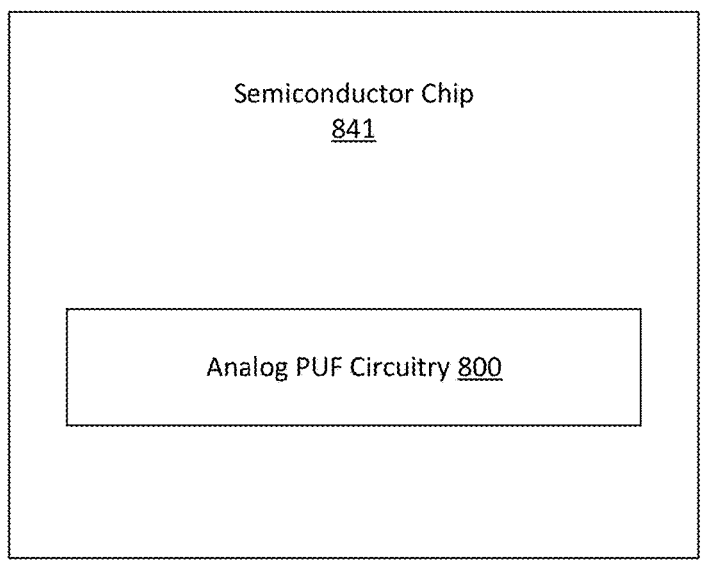
FIG. 8 illustrates a semiconductor chip having a soft-decoding PUF thereon, according to an embodiment of the present application.

FIG. 8 illustrates a semiconductor chip 841 having soft-decoding PUF circuitry 800 thereon, according to an embodiment of the present application. The semiconductor chip 841 may be any suitable semiconductor chip, such as a processor, microprocessor, field-programmable gate array (FPGA), and/or an application specific integrated circuit (ASIC). The semiconductor chip 841 is connected to soft-decoding PUF circuitry 800, which may be any suitable soft-decoding PUF circuitry 800 such as was described with reference to FIGS. 1-4. In some embodiments, the soft-decoding PUF circuitry 800 may be dispersed on the semiconductor chip 841. The soft-decoding PUF circuitry 800 may be controlled by the semiconductor chip 841 and, in response to a signal from the semiconductor chip 841, output a PUF value to the semiconductor chip 841. The semiconductor chip 841 may use the PUF value for encryption, authentication, and/or any suitable purpose.

Figure 9:
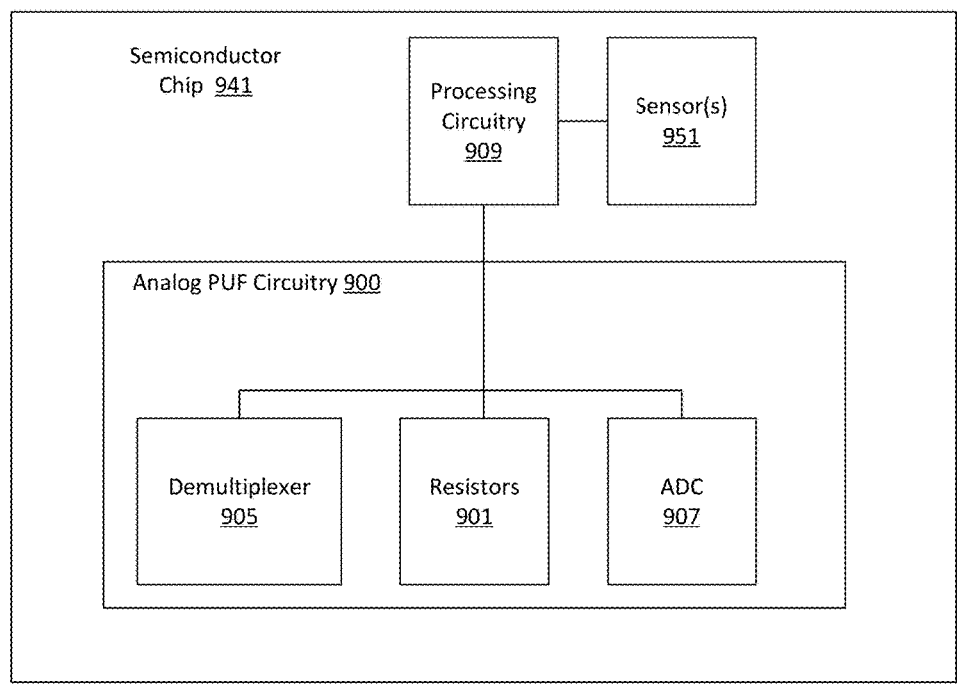
FIG. 9 illustrates a semiconductor chip having a sensor and a soft-decoding PUF thereon, according to an embodiment.

FIG. 9 illustrates a semiconductor chip 941 having sensor(s) 951 and soft-decoding PUF circuitry 900 thereon, according to an embodiment. The semiconductor chip 941 includes processing circuitry 909, sensor(s) 951, and soft-decoding PUF circuitry 900, which includes a demultiplexer 905, resistors 901, and ADC 907. The semiconductor chip 941 and/or processing circuitry 909 may be any suitable semiconductor chip, such as a processor, microprocessor, FPGA, and/or an ASIC. The sensors 951 may be any suitable sensors configured to collect data. In some embodiments, the sensor(s) 951 include motion sensors (e.g., an accelerometer and/or gyroscope among other motion sensors), position sensors (e.g., a global positioning system receiver among other position sensors), environmental sensors (e.g., temperature sensors among other environmental sensors), medical sensors (e.g., electrocardiogram, pulse oximetry, among other sensors), and/or any other suitable sensors. In some embodiments, the sensor(s) 951 may be suitable transducers. Soft-decoding PUF circuitry 900 allows that semiconductor chip 941 to encrypt data from the sensor(s) 951 and/or authenticate devices that receive data from the sensor(s) 951.

The soft-decoding PUF circuitry 900 includes circuitry for generating PUF values based on the impedance values of circuit elements, for example as was described with reference to FIGS. 1-4. In some embodiments, the soft-decoding PUF circuitry 900 may be dispersed on the semiconductor chip 941. In some embodiments, portions of the sensor(s) 951, the semiconductor chip 941, and any packaging thereof may be used as one of the resistors 901, for example to detect tampering with the semiconductor chip 941 with a changed PUF value. The demultiplexer 905 connects a voltage and/or current source to one or more of the resistors 901 to generate voltage signals, which may indicate individual impedance values and/or a ratio of the impedance values of the connected resistors. The voltage signals are digitized by the ADC 907 and the digital voltage signals may be combined by the processing circuitry 909 to generate one or more PUF values, as was described with reference to earlier FIGS.

Figure 10:
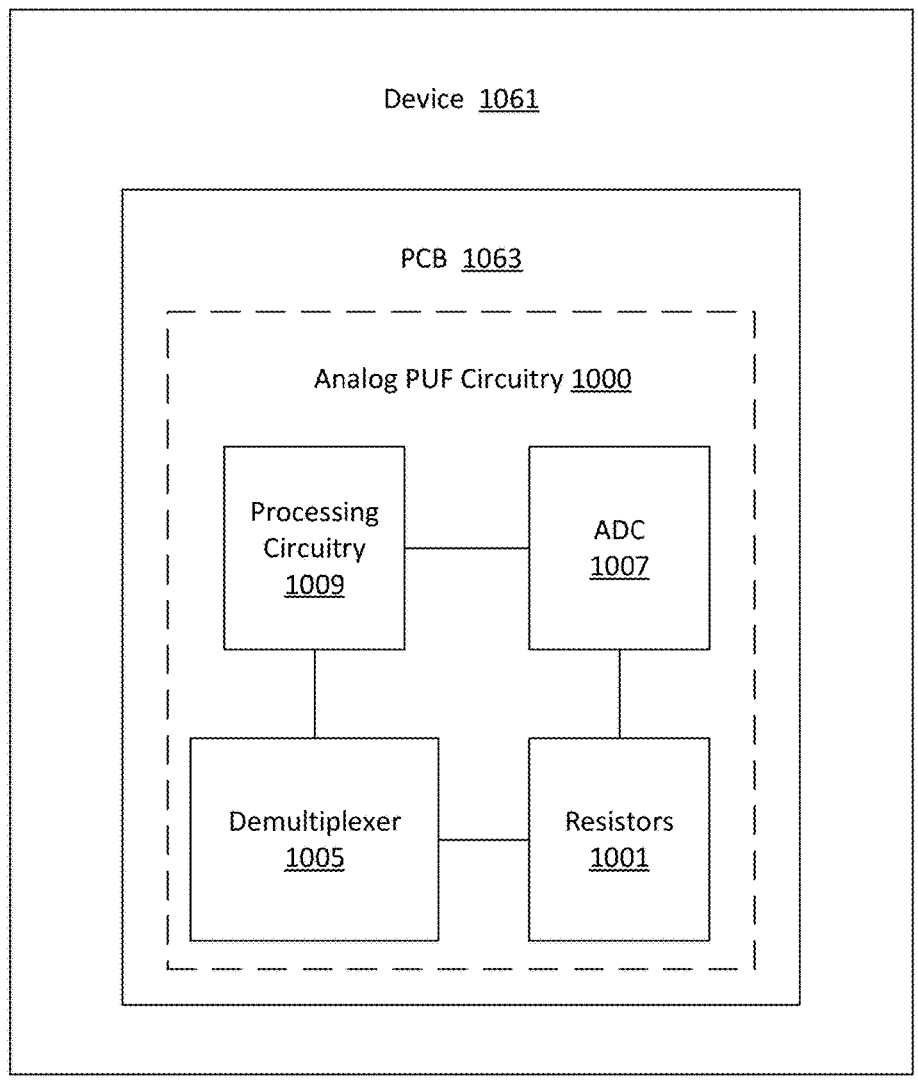
FIG. 10 illustrates a device comprising a printed circuit board with a soft-decoding PUF of the types described herein, according to an embodiment of the present application.

FIG. 10 illustrates a device 1061 comprising a printed circuit board 1063 with soft-decoding PUF circuitry 1000 of the types described herein, according to an embodiment of the present application. FIG. 10 illustrates device 1061, which includes soft-decoding PUF circuitry 1000 that is connected to a PCB 1063. The soft-decoding PUF circuitry 1000 is connected to the PCB 1063 and includes processing circuitry resistors 1001, demultiplexer 1005, ADC 1007, and processing circuitry 1009.

The device may be any suitable mobile or stationary electronic device. The device may use the soft-decoding PUF circuitry 1000 to generate PUF values for encryption, authentication, and/or any suitable purpose. In the example of FIG. 10, the PCB 1063 is packaged within the device 1061. In some embodiments, the PCB 1063 is physically coupled and/or electrically connected to the device 1061 in any suitable manner. For example, the PCB 1063 may removably attach to the device 1061 through an interface, such as a Universal Serial Bus (USB) interface. The soft-decoding PUF circuitry 1063 may function as was described with reference to FIGS. 1-4, 8, and 9.

In some examples, the components disclosed herein may read parameters or instructions that affect the functions performed by the components. These parameters or instructions may be physically stored in any form of suitable memory including volatile memory (such as RAM) or nonvolatile memory (such as a magnetic hard drive). In addition, the parameters or instructions may be logically stored in a propriety data structure (such as a database or file defined by a user space application) or in a commonly shared data structure (such as an application registry that is defined by an operating system). In addition, some examples provide for both system and user interfaces that allow external entities to modify the parameters and instructions and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture.

It is to be appreciated that embodiments of the methods and apparatuses described herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features described in connection with any one or more embodiments are not intended to be excluded from a similar role in any other embodiments.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus for providing an impedance based physically unclonable function (PUF), comprising:
   a first pair of resistors electrically connected in a first current path, the first pair of resistors having a first impedance ratio;
   a second pair of resistors electrically connected in a second current path, the second pair of resistors having a second impedance ratio;
   an analog-to-digital converter (ADC), configured to generate a plurality of bits based on:
      a first voltage signal from the first current path that indicates the first impedance ratio; and
      a second voltage signal from the second current path that indicates the second impedance ratio; and
   processing circuitry configured to generate a PUF value based on the plurality of bits.

2. The apparatus of claim 1, wherein the ADC is further configured to generate the plurality of bits based on a first plurality of bits obtained from the first voltage signal and a second plurality of bits obtained from the second voltage signal.

3. The apparatus of claim 1, further comprising a demultiplexer configured to: connect one of the first pair of resistors and the second pair of resistors to a voltage source.

4. The apparatus of claim 2, wherein the processing circuitry is configured to generate the PUF value by concatenating the first plurality of bits and the second plurality of bits.

5. The apparatus of claim 1, wherein the processing circuitry is configured to generate the PUF value by selecting a portion of the plurality of bits.

6. The apparatus of claim 1, wherein at least one of the first pair of resistors and the second resistor pair of resistors is selected from a plurality of pairs of resistors.

7. The apparatus of claim 1, wherein the processing circuitry is further configured to select, based on the plurality of bits, an additional pair of resistors having an additional impedance ratio; and the ADC is further configured to generate an additional plurality of bits representing an additional voltage signal that indicates the additional impedance ratio.

8. The apparatus of claim 7, wherein a first resistor of the first pair of resistors comprises resistive material including a kerf.

9. The apparatus of claim 1, wherein a resistor from the first and second pairs of resistors is a trimmed resistor.

10. The apparatus of claim 9, wherein the trimmed resistor is configured to encode a predetermined value in an impedance value of the trimmed resistor.

11. A method for providing an impedance based physically unclonable function (PUF), comprising:
   providing a supply voltage to:
      a first pair of resistors electrically connected in a first current path, the first pair of resistors having a first impedance ratio; and
      a second pair of resistors electrically connected in a second current path, the second pair of resistors having a second impedance ratio;
   generating, using an analog-to-digital converter, a plurality of bits based on:
      a first voltage signal from the first current path that indicates the first impedance ratio; and
      a second voltage signal from the second current path that indicates the second impedance ratio; and
   generating a PUF value based on the plurality of bits.

12. The method of claim 11, further comprising generating the plurality of bits based on a first plurality of bits obtained from the first voltage signal and a second plurality of bits obtained from the second voltage signal.

13. The method of claim 12, wherein generating the PUF value comprises concatenating the first plurality of bits and the second plurality of bits.

14. The method of claim 11, further comprising providing, using a demultiplexer, the supply voltage to one of the first pair of resistors and the second pair of resistors.

15. The method of claim 11, wherein generating the PUF value comprises selecting a portion of the plurality of bits.

16. The method of claim 11, further comprising selecting at least one of the first pair of resistors and the second pair of resistors from a plurality of pairs of resistors.

17. The method of claim 11, further comprising:
   selecting, based on the plurality of bits, an additional pair of resistors having an additional impedance ratio; and
   generating an additional plurality of bits representing an additional voltage signal that indicates the additional impedance ratio.

18. The method of claim 11, wherein a resistor from the first and second pairs of resistors is a trimmed resistor.

19. The method of claim 18, further comprising encoding a predetermined value in an impedance value of the trimmed resistor.

20. A system for providing an impedance based physically unclonable function (PUF), comprising:
   a processor package comprising:
      a first resistor pair having a first impedance ratio;
      a second resistor pair having a second impedance ratio;
      an analog-to-digital converter (ADC) electrically connected to the first resistor pair and the second resistor pair, wherein the ADC is configured to generate one or more bits that represent a difference between a voltage signal that indicates the first impedance ratio and a voltage signal that indicates the second impedance ratio; and
      processing circuitry configured to generate a PUF value based on of the one or more bits.

* * * * *